June 2, 1959 G. OGLIETTI ET AL 2,889,404

TOKEN-OPERATED TELEPHONE FOR AUTOMATIC LOCAL CALLS AND AUTOMATIC AND MANUAL LONG-DISTANCE CALLS

Filed March 20, 1953 6 Sheets-Sheet 1

INVENTORS
Giovanni Oglietti and
Vittorio Caramella

BY Stevens, Davis, Miller and Mosher
ATTORNEYS

INVENTORS
Giovanni Oglietti and
Vittorio Caramella

BY Stevens, Davis, Miller and Mosher
ATTORNEYS

INVENTORS
Giovanni Oglietti and
Vittorio Caramella
BY Stevens, Davis, Miller and Mosher
ATTORNEYS June 2, 1959 G. OGLIETTI ET AL 2,889,404

TOKEN-OPERATED TELEPHONE FOR AUTOMATIC LOCAL CALLS AND AUTOMATIC AND MANUAL LONG-DISTANCE CALLS

Filed March 20, 1953 6 Sheets-Sheet 4

INVENTORS
Giovanni Oglietti and
Vittorio Caramella
BY
Stevens, Davis, Miller and Mosher
ATTORNEYS INVENTORS
Giovanni Oglietti and
Vittorio Caramella
BY
Stevens, Davis, Miller and Mosher
ATTORNEYS INVENTORS
Giovanni Oglietti and
Vittorio Caramella
BY
Stevens, Davis, Miller and Mosher
ATTORNEYS 2,889,404

TOKEN-OPERATED TELEPHONE FOR AUTOMATIC LOCAL CALLS AND AUTOMATIC AND MANUAL LONG-DISTANCE CALLS

Giovanni Oglietti and Vittorio Caramella, Torino, Italy

Application March 20, 1953, Serial No. 343,548

Claims priority, application Italy March 24, 1952

7 Claims. (Cl. 179—6.31)

The invention relates to a telephone pre-pay apparatus for local and long-distance calls of the teleselective type from subscriber to subscriber at a constant or cyclic rate, i.e. wherein the time factor is variable for each call according to the zone requested, and wherein tokens or coins previously inserted into two separate apertures of a coin gage, are collected one by one as a result of current impulses transmitted from the central station to an electromagnet of the apparatus, and a mechanical impulse transmitted to the electromagnet itself by means of a device associated with the apparatus, whereas the tokens unused at the end of the conversation are returned to a return box.

Apparatus along this general line are already known, i.e., apparatus capable of translating into value, by means of collected tokens or coins, the impulses registered by the counter at the central station for both local and long-distance calls.

It is known that local calls can be made at a fixed rate. In that case each call is recorded by the counter at the central station and the conversations, in many instances, are of unlimited duration. This rate is also applied to teleselective communications and constitutes the basic charge rate for a conversation of a duration varying in inverse ratio with the distance between the networks of the subscribers. However, this duration is often too short, especially for long-distance conversations, and can be considered a fraction of the conversation itself. The conversation, therefore, may last one or more fractions.

In systems involving the so-called time and zone counting, to automatically charge a subscriber at constant intervals during the conversation, the counting device at the central station registers as many charges, i.e., as many basic time units, as correspond to the time fractions consumed for a given conversation.

The apparatus involved in the present invention is provided with two apertures into which two types of tokens of different values may be thrust, one U being of a value twice the basic charge rate, the other M being of a value corresponding to the basic charge rate.

The charge for a local call is a single token U which is collected at the end of the conversation by an electrical impulse arriving at the electromagnet of the collecting device. A teleselective call requires the insertion in the apparatus of a single token M and a number of tokens U depending upon the length of the conversation and the distance of the call.

The system also provides for the additional collection of one token U for each teleselective conversation, the collection being effected by means of an electrical impulse and a mechanical impulse arriving at the electromagnet of the collecting device.

The collection of tokens during the course of a teleselective conversation takes place in the following order: one token U upon arrival of the first impulse from the central station (generally at the answer of the called party) and thereafter, one token U for each two electrical impulses and one additional token U, at the end of the conversation, if the total number of impulses received from the central station is odd, whereas if the number of impulses is even the token M is collected.

The use of tokens having twice the normal value has the additional advantage of reducing the number of tokens for each call as well as the dimensions of the inlets and channels for the introduction of the tokens.

The problem involving the collection of the tokens in the manner described has been solved in accordance with the present invention by means of a device associated with the collecting electromagnet for moving alternatively two stops into the channel provided for token U and one stop into the channel provided for token M. However, this last token is stopped farther in the rear by another stop which is activated or inactivated by raising or lowering the receiver hook.

When the tokens U are first inserted in the channel they will find the passage, after penetrating it to a certain point, obstructed by one of the aforesaid stops which is removed with the first impulse of the electromagnet while, at the same time, a second one is caused to advance in stopping position farther at the rear, i.e., toward the inlets for the introduction of tokens. Thus, at the arrival of the first impulse of the electromagnet, one token U is set free while the other tokens are held up by the second stop. With the second impulse the token that follows passes from the second to the first stop and is collected at the next impulse emitted.

After the receiver is replaced, prior to initiating the return of the excess tokens, the electromagnet is operated once more, through mechanical action, to complete the collection. After this operation, the discharge device comes into play and if, at this moment, the second stop projects into the channel for token M the latter is refunded, otherwise it is collected.

After the last token U is collected, the conversation no longer can take place.

The collecting electromagnet only requires a small amount of electrical current for its operation because the device associated therewith is very light.

There are also provided three levers of which two are applied to the channel for the tokens U and the third is applied to the channel for the token M at the inclined sections thereof where the stops enter into play. These levers, which constitute the runways for the tokens in these sections, are lowered by the tokens themselves and remain in lowered position as long as there are tokens immobilized in the channels. They move the contacts which activate or inactivate the apparatus for the selection of the call, the teleselective conversation and the energization or de-energization of the electromagnet for the collection of the tokens in the charging circuit.

The two levers of the channel for the tokens U also serve to direct the excess or uncollected tokens toward the refund mechanism. One of the two levers, upon which the tokens come to rest, is maintained during the conversation on the same plane as the other. When the conversation is terminated, it is further lowered to allow the tokens that are still in the channel to pass under the stops and be discharged into the refund chute in response to the deflection created, in the meantime, by the mechanism provided for this purpose.

A second electromagnet operatively contributes to the activation and deactivation of the teleselective conversation. It functions at the first charging impulse emitted, whereupon its armature remains mechanically attracted until the switch hook is lowered.

The invention also provides an additional lever whose return movement into a position of rest is controlled by a speed control mechanism consisting of an air brake which only acts during the return movement. This lever, at the beginning of its movement into position of rest, has also the function of opening the contacts which interrupt the circuit. It thereafter transmits the final mechanical impulse to the electromagnet, operates the deflecting mechanism for the refund of the tokens, restores the electromagnet to a position of rest, directs the discharge of the uncollected tokens, returns the stops into their initial position, if they are not already in that position, and, finally, interrupts the circuit of the electromagnets to prevent their energization by the current of incoming calls.

This lever is carried along by the switch hook as the latter is raised. Lowering of the hook frees the lever which then cannot be engaged by the hook until it is returned to a position of rest.

There is also provided, in accordance with the present invention, a device for deflecting the uncollected tokens towards a channel leading to the refund chute. This device consists of two slides which, projecting obliquely into the interior of a vertical section of the channel, causes the tokens to slide out of the channel through two windows in one of the walls of the channel, whereupon they are directed to the refund chute.

The object of the invention will be described hereinafter in greater detail with reference to the accompanying drawings, in which:

Figure 1 is a perspective view illustrating the constructional assembly of the token collecting device and of the levers controlling the final operations;

Figures 2*a*, 2*b*, and 3 are diagrams of the hook arrangement and of the levers controlling the final operations wherein the levers are in the descending phase or in position of rest respectively;

Figure 7A:
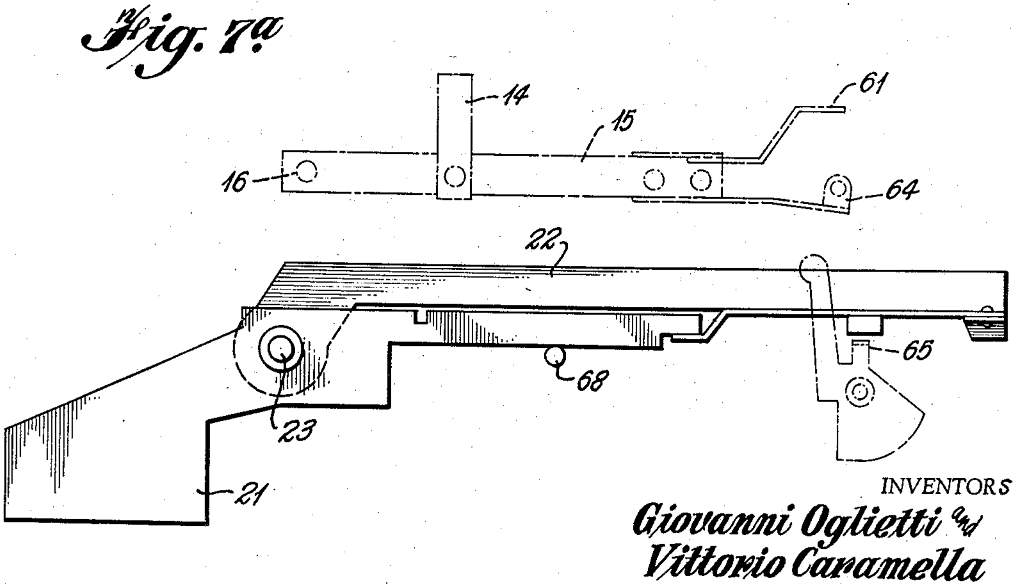
Figure 7B:
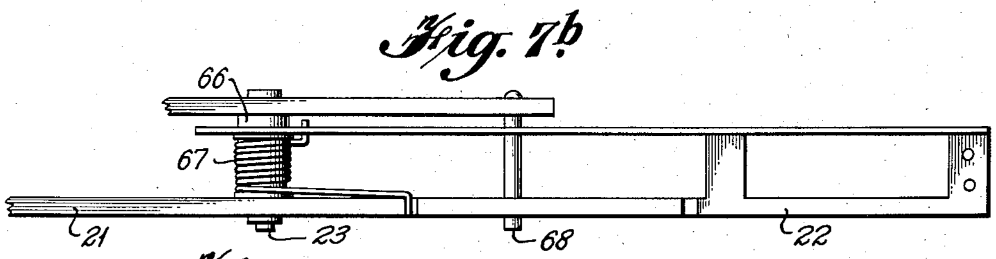
Figures 8, 9, 10:
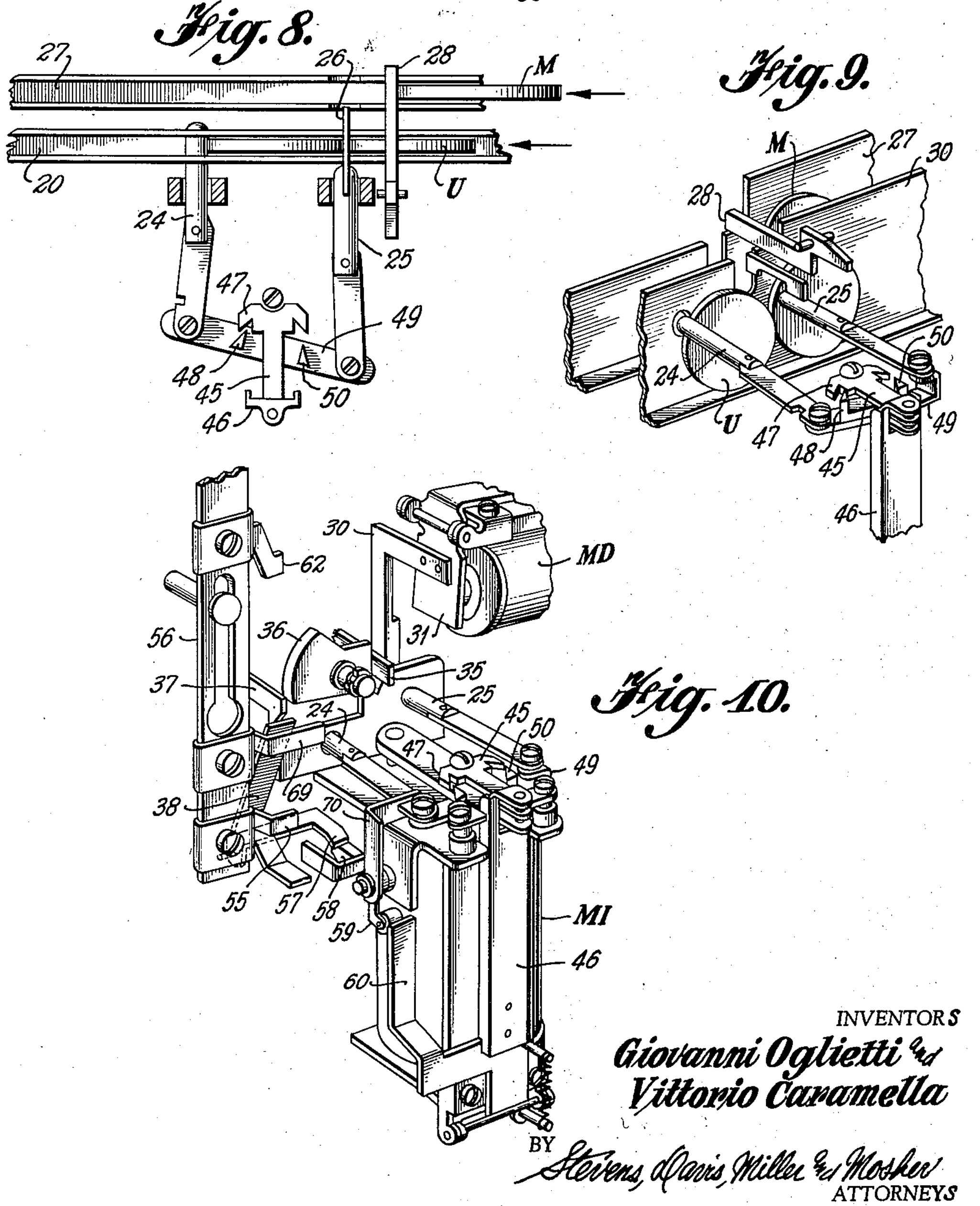
Figure 11:
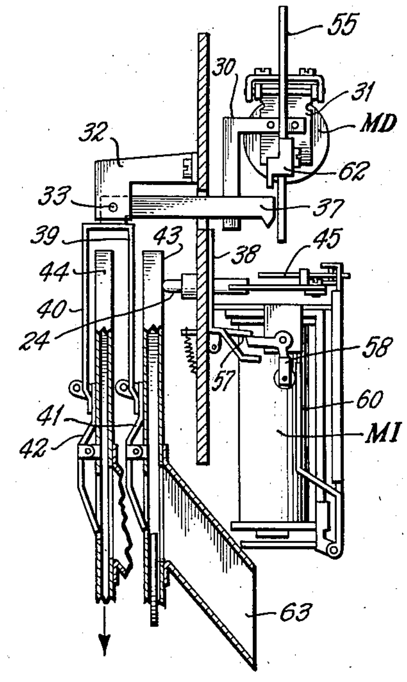
Figure 12:
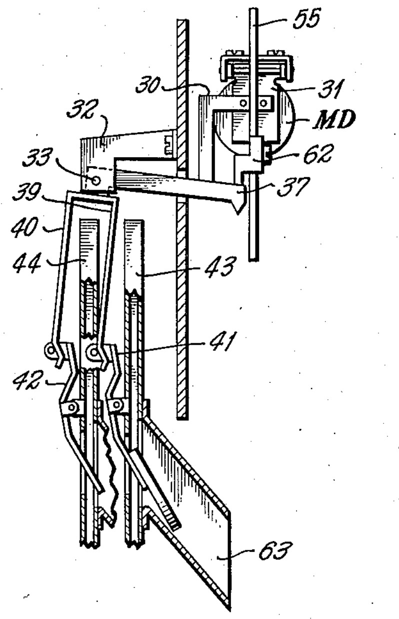
Figure 13:
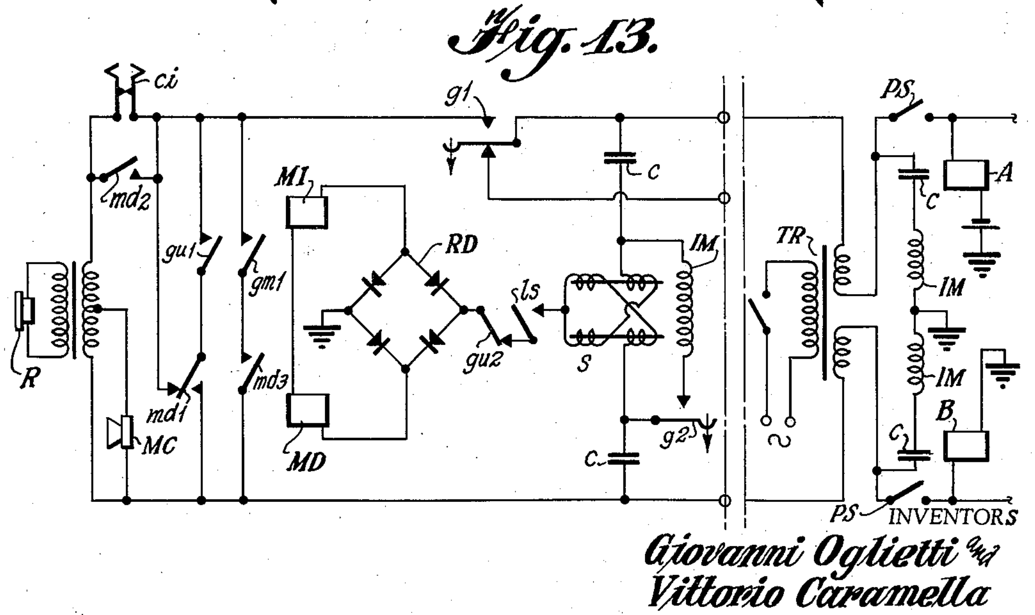

Figures 7*a* and 7*b* is a diagram of a part of the complex of activating levers;

Figure 8 is a diagram of a part of the token collecting device;

Figures 9 and 10 are perspective views of details of the token collecting device;

Figures 11 and 12 represent diagrams of the deflecting device in collecting and refunding position respectively; and Figure 13 is the electrical circuit of the apparatus.

Figure 1:
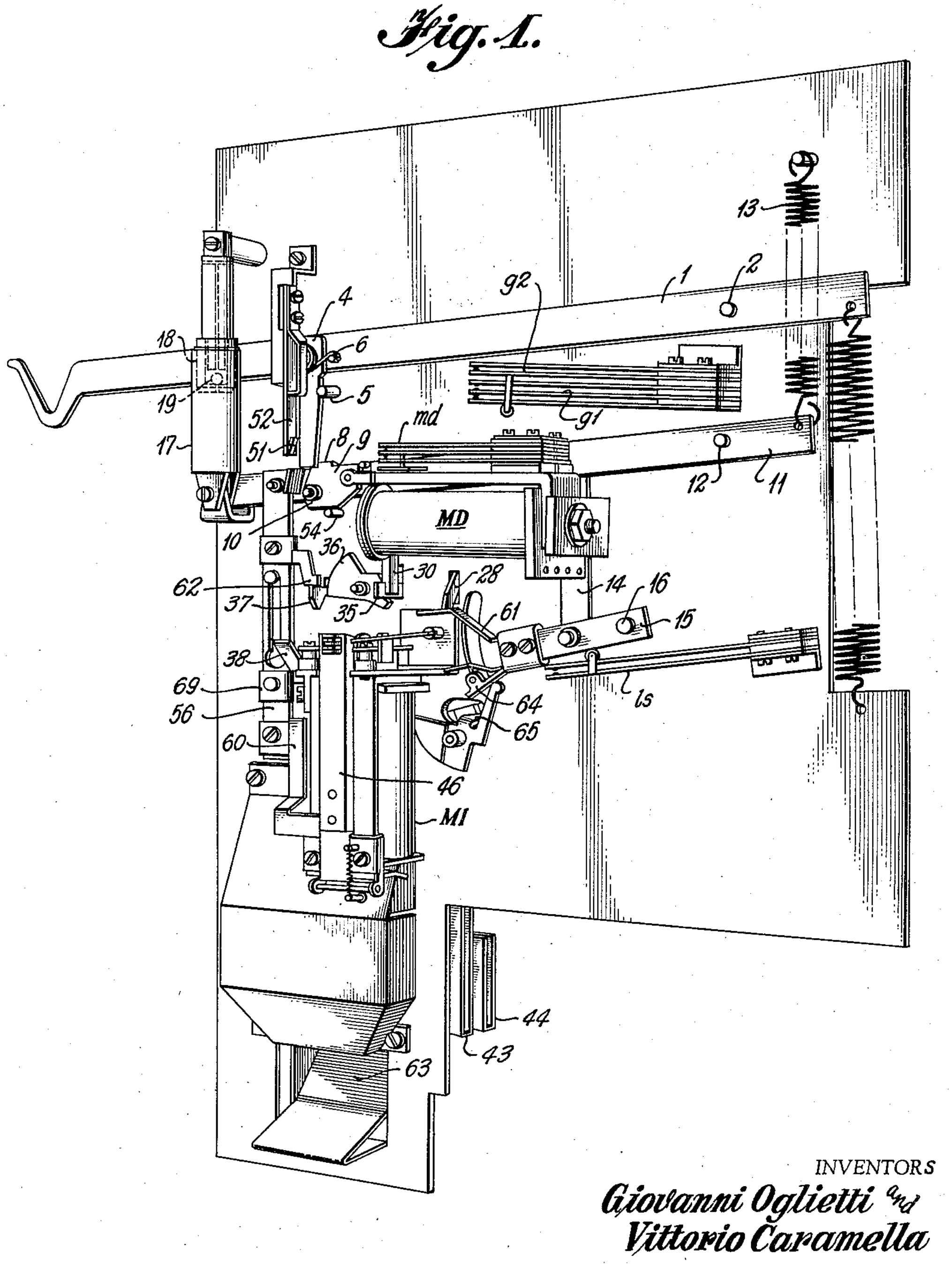
Figure 2A:
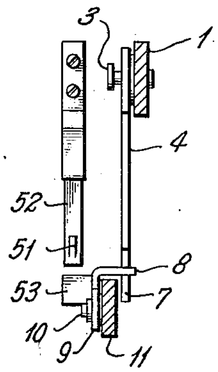
Figure 2B:
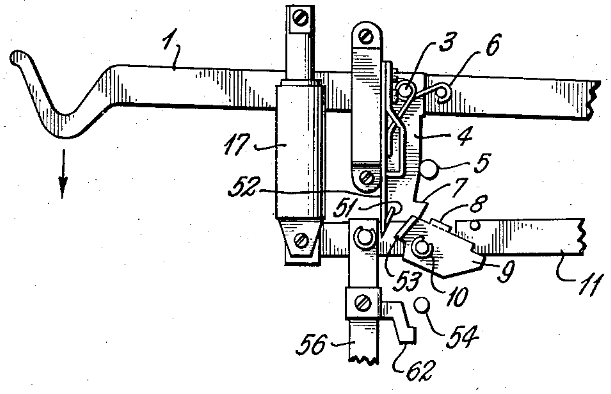
Figures 3, 4:
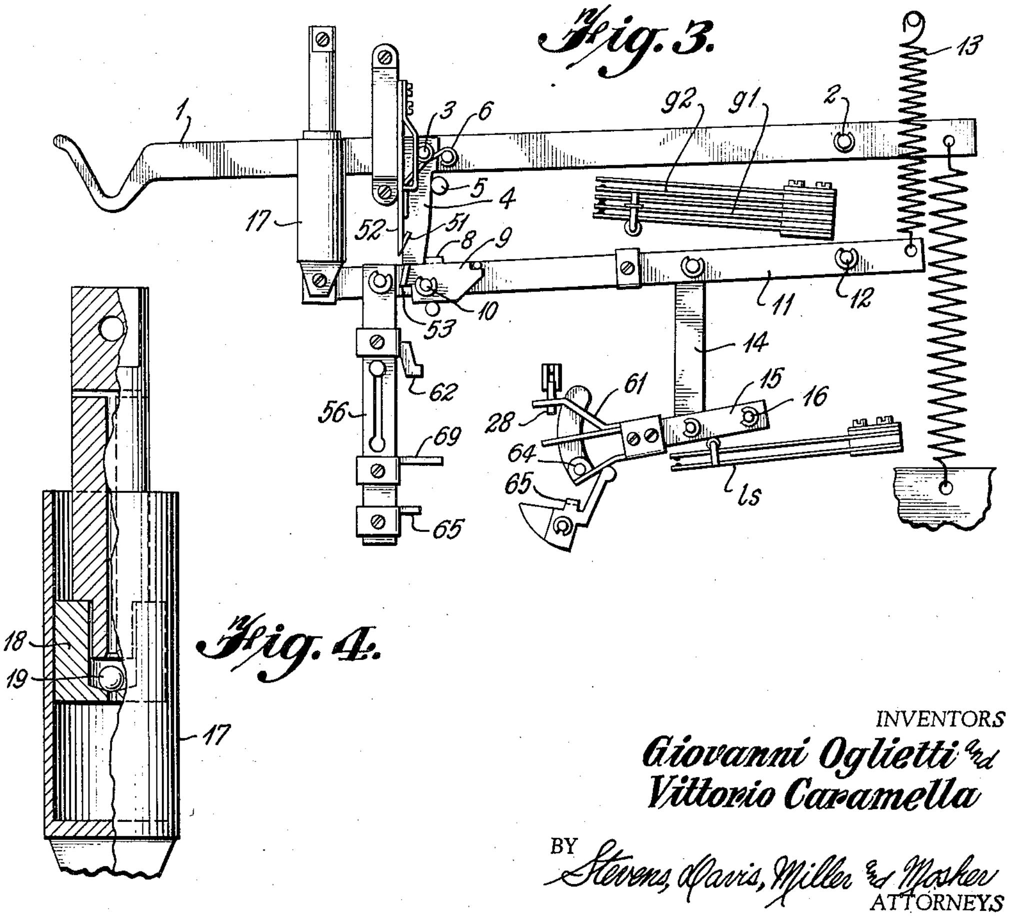
Figure 4 is a view of the speed control device partly broken away.

On lever 1 serving as a hook for the receiver (Figures 1, 2*a*, 2*b* 3) and pivoted at 2, is fastened pin 3 on which is mounted small rod 4 held against peg 5 by spring 6. When lever 1 is lowered, tooth 7 of the small rod (Figures 2*a* and 2*b*) is hooked to the small hook 8 of pallet 9 rotating upon pin 10 associated with lever 11 pivoting at 12 and urged downwardly by spring 13.

When the receiver is unhooked the arm of lever 1 carrying small rod 4 is raised and thereby pulls along lever 11. The latter is connected by means of rod 14 to lever 15 pivoting at 16. Thus, when lever 11 is raised it is followed by lever 15 which permits closing the contacts 1*s* for the energization of electromagnets MI and MD in the circuit. Lever 11, when it is raised, operates contacts $g^1$ and $g^2$ which close the line circuit and serve to place an impedance coil in parallel with the ringer to prevent a repetition of the impulses at the ringer during the selection of the call.

The air brake 17 (Figures 1, 2*b*, 3, 4) connected to one end of lever 11, includes a piston 18 having a small valve consisting of sphere 19 provided therein which is opened at the return movement, in order to eliminate the braking effect, and is closed during the downward movement of lever 11. On raising the lever 15, the complex of activating levers for the tokens U is set free. A more detailed description of this complex of levers is given hereinafter. The levers, when they are raised, effect the closing of contacts $gu^1$ and the opening of contacts $gu^2$.

The arrival of tokens U in the section of channel 20 causes lowering of the complex consisting of levers 21 and 20 mounted on pin 23 (Figures 5, 6, 7*a* and 7*b*). After this, the tokens advance and are stopped against the small cylindrical rod 24 which, together with the small shaft 25 and clip 26, constitute the stops for the tokens U and M (Figures 6, 8, 9, 10). Lever 21 actuates contacts $gu^1$ and $gu^2$. The contacts $gu^1$ activate the apparatus for the calls, $gu^2$ effect the energization of the electromagnets in the circuit.

The token M in the section of channel 27 (Figures 8, 9) is stopped against stop 28 and influences the lowering of lever 29 (Figure 5) which actuates contacts *gm* to activate the apparatus for teleselective conversations.

Figure 5:
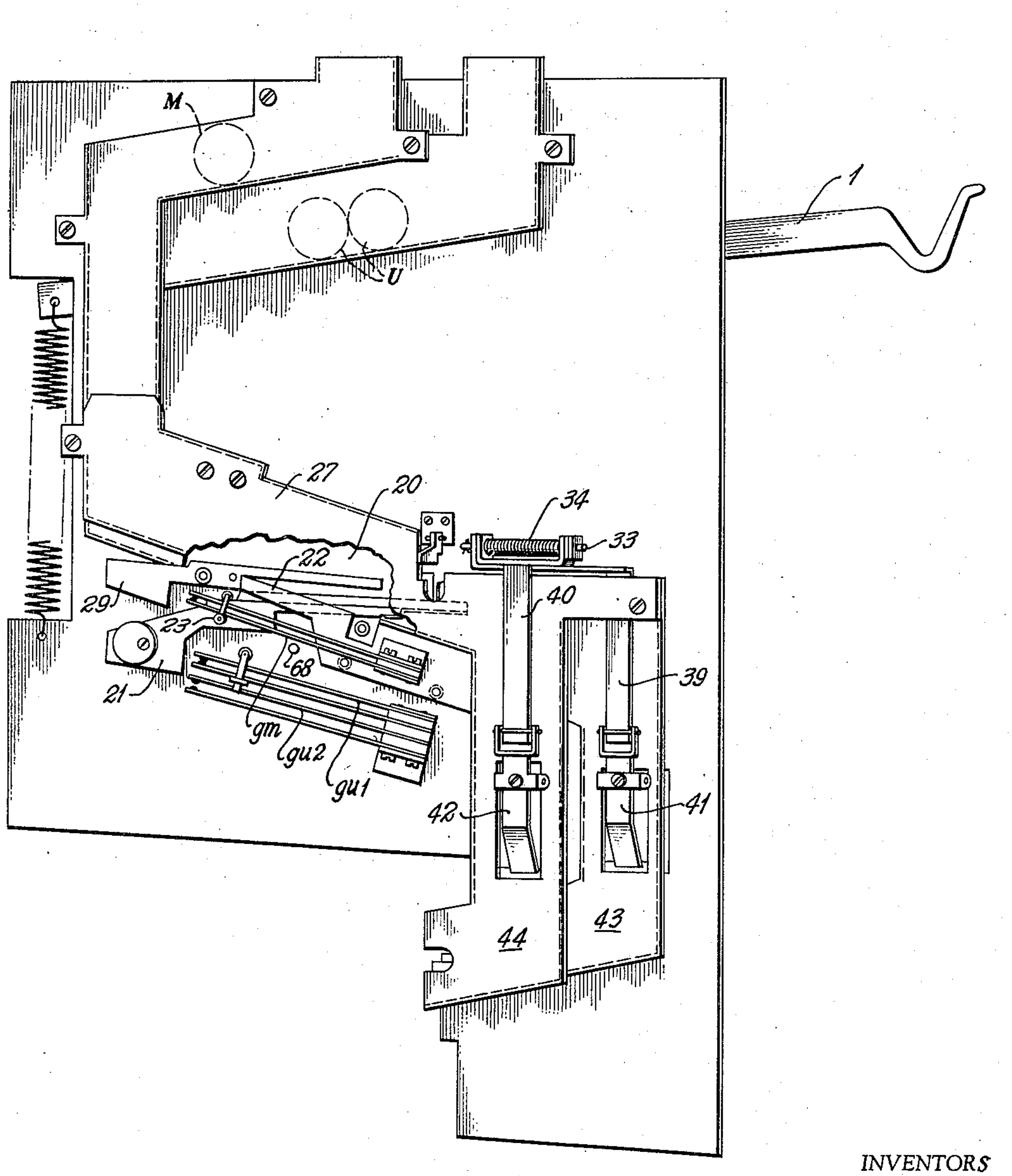
Figure 5 is a perspective view illustrating the constructional assembly of the token channels, the activating lever and the deflecting device.
Figure 6:
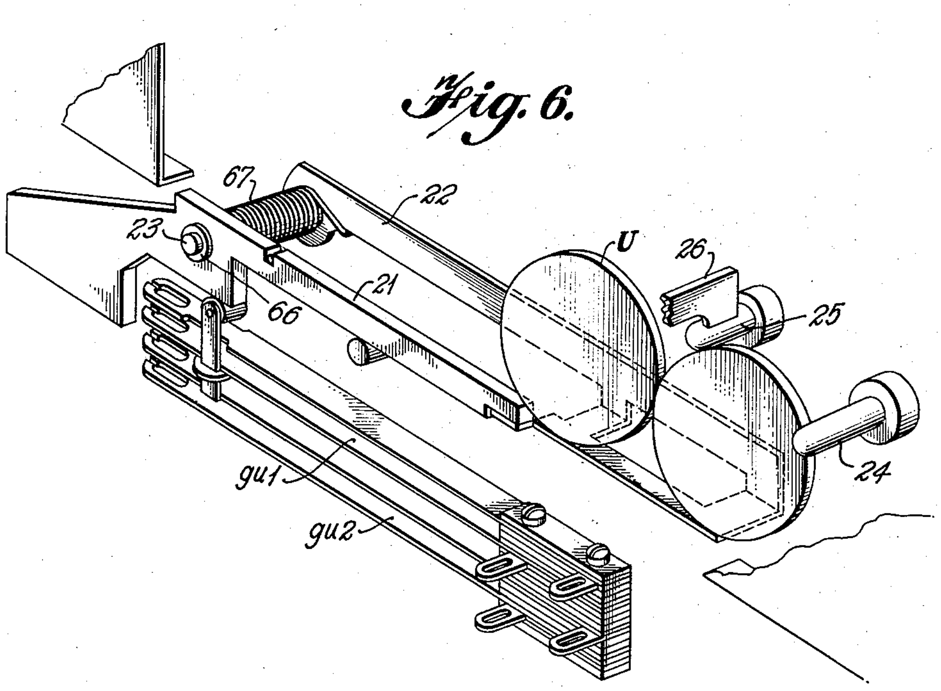
Figure 6 is a perspective view of the complex of activating levers.

Small shaft 30 secured to the armature 31 of electromagnet MD (Figures 1, 5, 10, 11, 12), upon excitation of the latter, frees lever 32 rotating on pin 33 which is suddenly urged upwardly by the action of spring 34. The arm 35 of lever 32 (Figures 1, 10, 11, 12) in turn frees pallet 36 which, as it points its tooth against small shaft 30, immobilizes the armature 31 in attracted position, whereas arm 37 of lever 32 frees small lever 38 (Figures 10, 11) which is urged upwardly by the action of a spring not shown in the drawing. Arms 37 and 40, on the other hand, move oscillating blades 41 and 42 so as to clear the path in the collecting channels 43 and 44 (Figures 5, 11, 12).

Armature 31 actuates contacts *md*1, 2, 3 (Figure 1) which serve respectively to prevent the conversation at the collection of the last token U, to short circuit the contacts of the dial upon arrival of the first charge impulse, and to prevent the conversation for the lack of taken M in the channel.

The electromagnet MI (Figures 8, 9, 10) being energized at the first impulse, causes the armature 45 pivoting at the end of shaft 46 to be moved. The tooth 47 of the armature meshes with tooth 48 of rocker arm 49 which, upon rotating through a certain arc, withdraws the small cylindrical rod or stop 24 from the channel and at the same time introduces stop 25. At the second impulse, the armature engages tooth 50 and returns stops 24 and 25 to their initial position. The tokens advance until they are stopped against stop 24. The cycle is repeated and one token is collected as a result of each two impulses.

If the conversation is continued until the supply of tokens is exhausted, at the collection of the last token the complex of levers 21 and 22 (Figures 5, 6, 7*a* and 7*b*) is raised and the conversation is prevented. On the other hand, if the conversation terminates when tokens are still present in the channel, upon replacing the receiver on the hook of lever 1 (Figures 1, 2*a*, 2*b*, 3) lever 11 is left to itself and upon descending causes the throwing over of pallet 9 by means of hook 51 of spring 52 engaged with the small hook 53 of said pallet 9. The latter are brought into their normal position, after the lever 11 has completed its descent, by peg 54 which prevents lever 11 during its downward movement from hooking onto lever 1. During the descent of lever 11 (Figures 1, 10) tooth 55 associated with rod 56 lowers small lever 38 whose tooth 57 actuates small lever 58, moves it and then abandons it by passing beyond. Small lever 58, by means of its small roller 59, moves arm 60 of shaft 46 which, by engaging armature 45, again moves stops 24 and 25 thereby completing the collection of the tokens. This collection is effected in the following manner.

*For token U.*—If the electrical impulses were of even number the token, prior to the arrival of the mechanical impulse, rests upon stop 24 (Figures 8 and 9) and the mechanical impulse, therefore, causes the collection thereof; if the electrical impulses were of odd number the token is refunded.

*For token M.*—If the electrical impulses were of odd number the stop 26 is penetrated into the interior of the channel for token M. The arrival of the mechanical impulse removes stop 26. Arm 61 of lever 15 (Figures 1, 3) descending with lever 11, raises small lever 28 which served as a stop for token M, and the latter is collected. However, in the case of electrical impulses of even number, the mechanical impulse restores the stop 26, the token is stopped against it when stop 28 is removed, and is finally refunded after the stops are returned to their initial position.

When the downward movement of lever 11 continues (Figures 1, 10, 11, 12) after the last collection, tooth 62 associated with shaft 56 lowers lever 32, which, by means of its arms 39 and 40, advances the two blades 41 and 42 obliquely into the interior of the two sections of channels 43 and 44 in such a way that the expelled tokens are caused to slide in the refund chute 63 through two windows provided in the wall of said channels.

Arm 64 of lever 15 (Figures 1, 3, 7*a*) removes support 65 from lever 22 and then lowers it to the extent that is necessary to allow the tokens to pass under the stops and be directed to the refund chute.

Lever 21 is mounted on collar 66 (Figures 6, 7*b*) together with lever 22. The arms of the two levers are held close together by the action of spring 67 so that lever 21 is urged to follow lever 22. However, when lever 21 comes to rest on pin 68 it is stopped, whereas lever 22 can be further lowered by overcoming the resistance of spring 67.

Finally tooth 69 of shaft 56 (Figure 10) moves lever 70 which meshes with rocker arm 49 to return the stops to their initial position.

In Figure 13, the reference indicia adopted is S for the ringer, MC for the microphone, R for the receiver, *ci* for the contacts of the impulses of the dial, TR for the balanced transformer supplying current to the line, PS for the preselection of the central station and A and B for the relays feeding the first group selector.

What is claimed is:

1. In a telephone prepay apparatus for local and toll calls of the so called teleselective type from subscriber to subscriber at a cyclic or constant charge rate including means for receiving a plurality of tokens and a receiver hook, the improvement comprising a collection device for collecting tokens from said means for receiving tokens, a mechanism actuated responsive to applied electrical impulses for actuating said collection device to collect tokens at a constant rate, and a mechanical device actuated responsive to completion of the call for actuating said collection device to effect supplemental collection of a token, said mechanical device including a pivoted lever linked to follow the movement of said receiver hook of the apparatus, a second lever mechanically connected to said first-mentioned lever, means actuated by the movement of said second lever to actuate in turn said collection device, and means to detach said first mentioned lever from said receiver hook upon downward movement of said receiver hook and to reconnect said first-mentioned lever to said receiver hook when it has returned to a complete position of rest.

2. In a telephone prepay apparatus for local and toll calls of the so called teleselective type from subscriber to subscriber at a cyclic or constant charge rate including means for receiving a plurality of tokens and a receiver hook, the improvement comprising a collection device for collecting tokens from said means for receiving tokens, a mechanism actuated responsive to applied electrical impulses for actuating said collection device to collect tokens at a constant rate, and a mechanical device actuated responsive to completion of the call for actuating said collection device to effect supplemental collection of a token, said mechanical device including a pivoted lever linked to follow the movement of said receiver hook of the apparatus, a second lever mechanically connected to said first-mentioned lever, means actuated by the movement of said second lever to actuate in turn said collection device, and an airbreak connected to said first-mentioned lever to retard the movement thereof in at least one direction.

3. In a telephone prepay apparatus for local and toll calls of the so called teleselective type from subscriber to subscriber at a cyclic or constant charge rate including means for receiving a plurality of tokens, the improvement comprising a collection device for collecting tokens from said means for receiving tokens, a mechanism actuated responsive to applied electrical impulses for actuating said collection device to collect tokens at a constant rate, and a mechanical device actuated responsive to completion of the call for actuating said collection device to effect supplemental collection of a token, said means to receive tokens being adapted to receive tokens of two values and said collection device including a rocker arm, two stops carried by said rocker arm adapted to intercept tokens of one value alternatively and a third stop carried by said rocker arm adapted to intercept tokens of the other value.

4. In a telephone pre-pay apparatus as defined in claim 3, the further improvement of said mechanism including an electromagnet the armature of which controls the movement of said rocker arm.

5. In a telephone prepay apparatus for local and toll calls of the so called teleselective type from subscriber to subscriber at a cyclic or constant charge rate including means for receiving a plurality of tokens and a receiver hook, the improvement comprising a collection device for collecting tokens from said means for receiving tokens, a mechanism actuated responsive to applied electrical impulses for actuating said collection device to collect tokens at a constant rate, a mechanical device actuated responsive to completion of the call for actuating said collection device to effect supplemental collection of a token, a discharge device, and a lever arm engaged to said receiver hook and becoming disengaged when said receiver hook lowers, said lever arm when disengaged operating said discharge device to refund unused tokens to the subscriber, said discharge device including a deflecting mechanism which when actuated, intercepts tokens in said apparatus and deflects them to a point of refund.

6. In a telephone prepay apparatus for local and toll calls of the so called teleselective type from subscriber to subscriber at a cyclic or constant charge rate including means for receiving a plurality of tokens and a receiver hook, the improvement comprising a collection device for collecting tokens from said means for receiving tokens, a mechanism actuated responsive to applied electrical impulses for actuating said collection device to collect tokens at a constant rate, and a mechanical device actuated responsive to completion of the call for actuating said collection device to effect supplemental collection of a token, a discharge device, and a lever arm engaged to said receiver hook and becoming disengaged when said receiver hook lowers, said lever arm when disengaged operating said discharge device to refund unused tokens to the subscriber, said discharge device including a pair of levers, means mounting said levers for a pivotal movement, a spring holding said levers together for pivotal movement in common, and a pin adapted to stop the pivotal movement of one of said levers but leave the other lever unobstructed for continued pivotal movement beyond said pin.

7. In a telephone prepay apparatus the improvement comprising a first means for receiving a token having a first value, a second means for receiving a plurality of tokens having a second value, a third means operated in response to applied electrical impulses to collect a token from said second means in response to the first applied impulse and to collect a token from said second means in response to each two additional applied impulses thereafter, and means actuated responsive to completion of the call for effecting the collection of a token from said first means if the total of the applied impulses is even and a token from said second means if the total number of applied impulses is odd.

References Cited in the file of this patent

UNITED STATES PATENTS

| | | |
|---|---|---|
| 1,480,403 | Lattig | Jan. 8, 1924 |
| 1,726,983 | Friendly | Sept. 3, 1929 |
| 2,093,988 | Appelius et al. | Sept. 28, 1937 |
| 2,134,168 | Wright | Oct. 25, 1938 |
| 2,192,025 | Busch | Feb. 27, 1940 |
| 2,289,507 | Langer | July 14, 1942 |

FOREIGN PATENTS

| | | |
|---|---|---|
| 557,421 | Great Britain | Nov. 19, 1943 |
| 595,708 | Great Britain | Dec. 15, 1947 |